US006342846B1

(12) United States Patent
Argentieri

(10) Patent No.: US 6,342,846 B1
(45) Date of Patent: Jan. 29, 2002

(54) ANGLE OF ATTACK DETECTION AND INDICATION SYSTEM

(75) Inventor: Michael A. Argentieri, West Orange, NJ (US)

(73) Assignee: Argen Aviation, Inc., West Orange, NJ (US)

( * ) Notice: Subject to any disclaimer, the term of this patent is extended or adjusted under 35 U.S.C. 154(b) by 0 days.

(21) Appl. No.: 09/392,401

(22) Filed: Sep. 9, 1999

Related U.S. Application Data

(60) Provisional application No. 60/100,535, filed on Sep. 9, 1998.

(51) Int. Cl.[7] ................................................ G01C 21/00

(52) U.S. Cl. ..................... 340/977; 340/967; 73/170.02

(58) Field of Search ................................ 340/977, 974, 340/967; 73/170.02, 170.01, 170.03, 170.05; 701/6, 14; 116/265

(56) References Cited

U.S. PATENT DOCUMENTS 2,350,820 A * 6/1944 Rettinger .................... 340/977
3,381,656 A * 5/1968 Ohnikian et al. ........... 340/977
3,475,958 A * 11/1969 Sabadishin et al. ...... 73/170.02
3,916,185 A * 10/1975 Jehly .......................... 340/977
4,112,413 A * 9/1978 Muhs et al. ................ 340/977
4,230,290 A * 10/1980 Townsend et al. .......... 340/967
5,115,237 A * 5/1992 Greene ....................... 340/967

* cited by examiner

*Primary Examiner*—John A. Tweel
(74) *Attorney, Agent, or Firm*—Duane Morris

(57) ABSTRACT

The angle of attack of an airfoil moving through the air can be detected and a display provided electronically through use of an all-solid-state system powered by a D.C. source. A wind vane mounted on one end of a shaft is exposed to the airflow while a windowed mask is provided at the other end of the shaft. By providing an appropriate array of openings in the mask, and a series of associated optical transmitters and receivers on opposed sides of the mask, extremely fine sensitivity can be provided in detection of angle of rotation of the mask and thus in the angle of rotation of the vane. The angle of the vane is directly established by the angle of attack. The detected angle of attack is then displayed on a vertically oriented light bar on the instrument panel, for instance in a light aircraft.

26 Claims, 6 Drawing Sheets

ANGLE OF ATTACK DETECTION AND INDICATION SYSTEM

RELATED APPLICATIONS

This application is related to and claims the benefit of co-pending provisional application serial No. 60/100,535 filed on Sep. 9, 1998 entitled ANGLE OF ATTACK DETECTION AND INDICATION SYSTEM.

FIELD OF THE INVENTION

The present invention relates to detection of the angle of attack of an airfoil moving through the air and is particularly useful in piloting of aircraft, including light aircraft.

BACKGROUND OF THE INVENTION

The flying of an aircraft is dependent on the generation of lift resulting from the movement of an airfoil through the air. The generation of lift results when the angle of the chord line of the airfoil relative to the apparent wind is within a relatively small range of angles, the acceptable range of angles of attack. As shown in FIG. 1, the angle of attack is defined as the angle between the airfoil chord line and the relative wind direction. The chord line is defined as the line that connects the trailing edge (A) of the wing with the center curvature (B) of the wing. This range of angles varies considerably from one airfoil design to another, but even so, is ordinarily not significantly higher than about 18 degrees for light aircraft. When the angle of attack exceeds its upper limit, air separates from the upper surface of the airfoil (wing) and results in a decrease in lift. This loss of lift, or stall, is generally associated with an inability of the wing to support the aircraft.

It is a well known safety feature of light aircraft to detect and inform the pilot of an excessive angle of attack because this is the primary indicator of conditions that accompany a stall, or loss of lift of the wings. Obviously, loss of lift at the wings is of major importance in the piloting of a plane. Providing a display on the instrument panel indicating the angle of attack provides the pilot with important information useful for maintaining a safe attitude while flying.

There have been prior attempts to provide an aircraft pilot with information from which the pilot can take corrective actions to avoid or minimize the entry of excessive angles of attack, but each prior effort has been subject to limitations in its utility for light aircraft. A major shortfall of known prior efforts has been their reliance on alternating current, a power source not generally available in light aircraft. These efforts have employed equipment that requires A.C. power for components such as synchro transmitters and servo repeaters. Also, potentiometers and gear trains have been employed to enhance signal resolution. These types of systems are costly to manufacture and thus, their use has been largely restricted to large expensive aircraft.

Prior systems based on A.C. power supplies generally have required a method of amplifying the small detected angle for proper viewing by the pilot on a rotary dial spanning 360 degrees. Most cockpit indicators require a servo repeater and a gear train to amplify the sensed indication for meaningful viewing by the pilot. One such system is described in U.S. Pat. No. 3,475,958 issued Mar. 16, 1967 to Sabadishin and Argentieri (the inventor herein) and incorporated herein by reference. Since most indicator system currently employ a gear train to amplify the angle of attack angle of 18 degrees to approximately 360 degrees for best viewing and indication to the pilot, stops are employed at the transducer to maintain the system in mechanical synchronization. The need for approximately 360 degrees is because of the use of a rotary dial type indicator.

The stops, the gear trains and the related shafts have been a constant source of problems such as problems associated with slippage. Furthermore, there are substantial maintenance requirements for system calibration. The angle of attack system described herein addresses the cost and technical problems of the prior known efforts. Additionally, a display is provided that is vertically oriented rather than circular, thus providing an easy means to observe indication of angle of attack.

DETAILED DESCRIPTION OF THE PREFERRED EMBODIMENT

Figure 2:
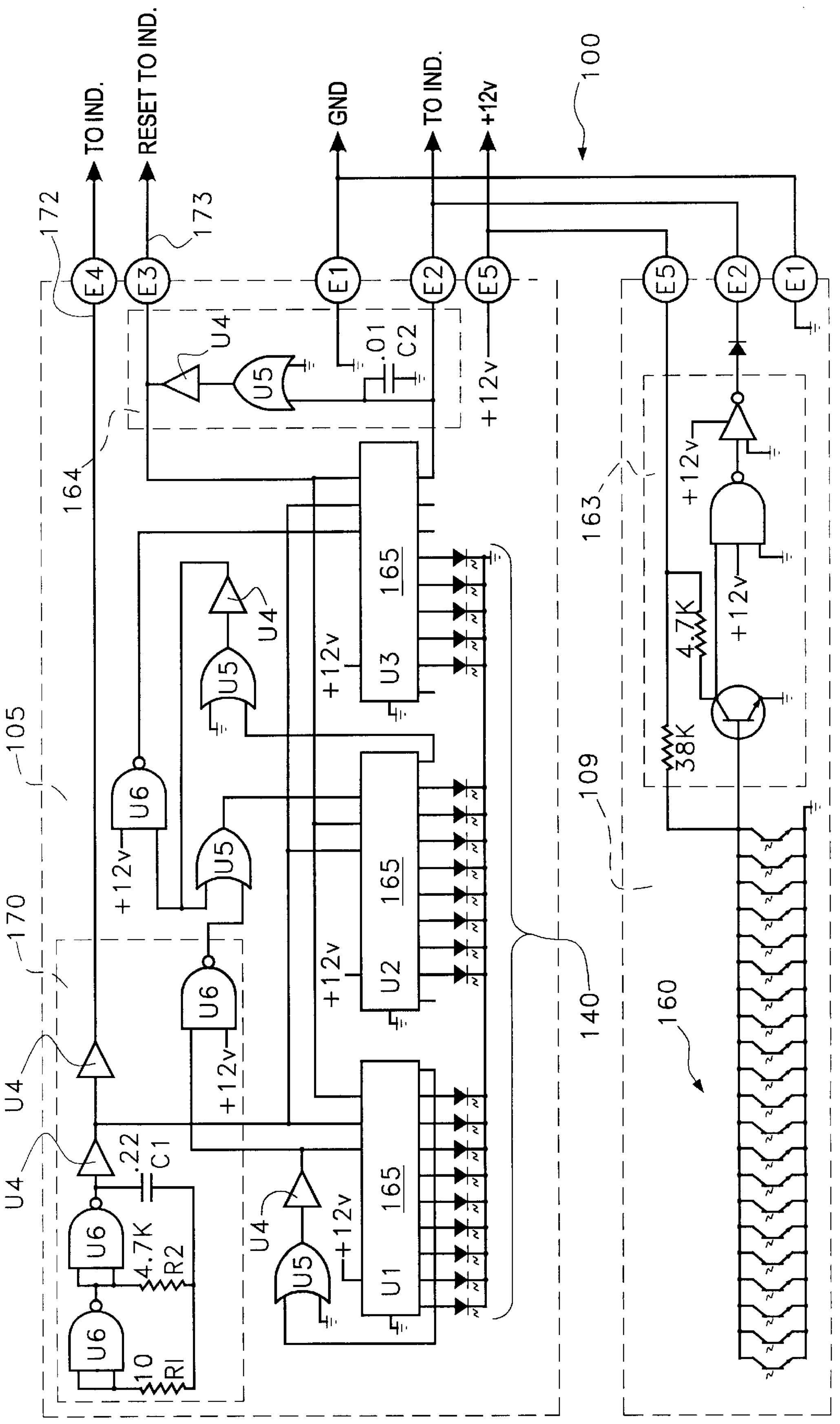
FIG. 2 is a circuit diagram of a transmitter suitable for use in accordance with a preferred embodiment of the invention.
Figure 4:
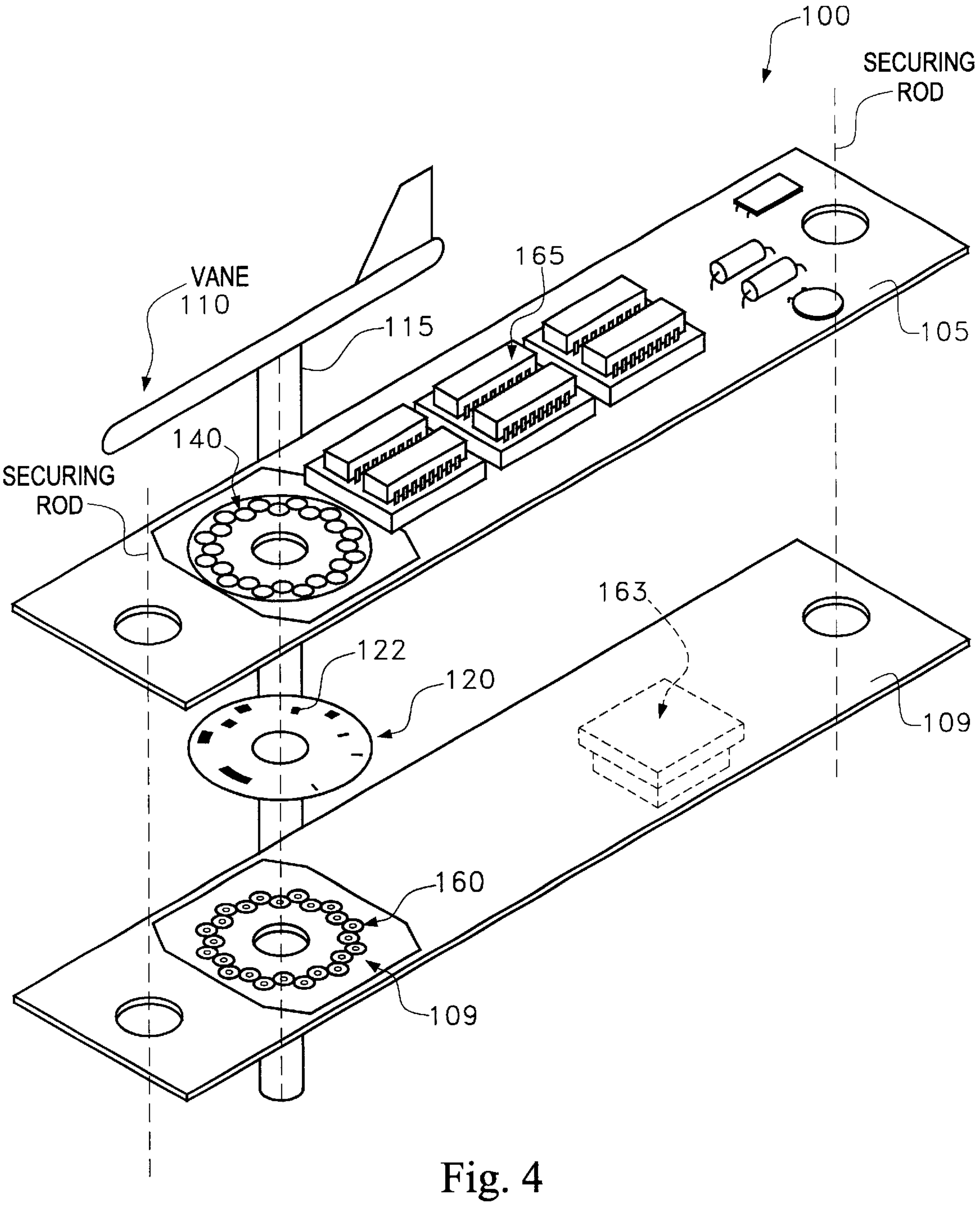
FIG. 4 illustrates the mechanical configuration of the transmitter according to the invention.

Referring now to the drawings, wherein like reference numerals are used to indicate like parts, and in particular to FIG. 4, transmitter 100 includes a vane 110 that is exposed to the slip stream outside an aircraft. The vane is directly coupled via shaft 115 to a circular mask 120 that is located between a set of circularly arranged illuminators such as LEDs 140 on one side and an associated set of photo sensor detector devices 160 on the opposite side. As shown in FIG. 4, there is a one-to-one correspondence between the two sets 140, 160. Mask 120 includes apertures 122 disposed in a corresponding circular pattern and is rotatable in response to the moveable vane 110. The mask operates to cover certain ones of the light emitting devices based on the position of the mask and the spaced apart slots or apertures, which enable radiation from at least one of the illuminated light emitting devices to pass to the corresponding detector for causing detection. The LED arrangement is preferably mounted on a printed circuit board 105. Electronic components which include decade counters 165 are also disposed on PC board 105 and operate at a clock frequency f to alternately illuminate the series of LEDs. A detailed illustration of the electronic circuitry is depicted in FIG. 2. The number of LEDs employed in the system is relative to the angle that is desired to be measured. As previously mentioned, displaced opposite every LED on PC board 105 (i.e. emitter board) is a corresponding photo transistor disposed on a second PC board 109. Electronic circuitry including reset detector logic 163 is also disposed on PC board 109. When a photo transistor detects a lit LED, a reset signal is generated which resets the decade counters 165 and restarts the alternate illumination of the LEDs 140. The mask, driven by the vane via shaft 115 operates to cover the illuminated LEDs corresponding to the vane displacement angle. Therefore, a reset signal is generated by the photo transistor when the first lit LED is encountered corresponding to the vane angle of attack position.

Figure 1:
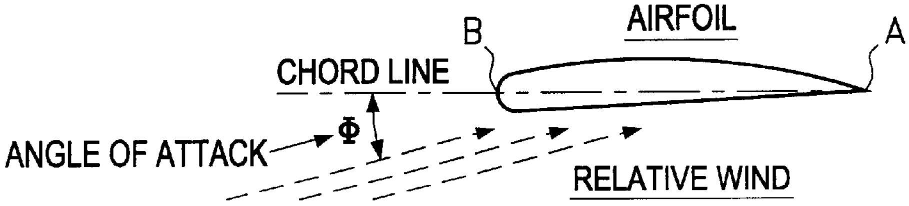
FIG. 1 is a schematic view showing the relative position of an airfoil in cross-section, with respect to the relative wind, the chord line of the airfoil and the angle of attack.
Figure 5:
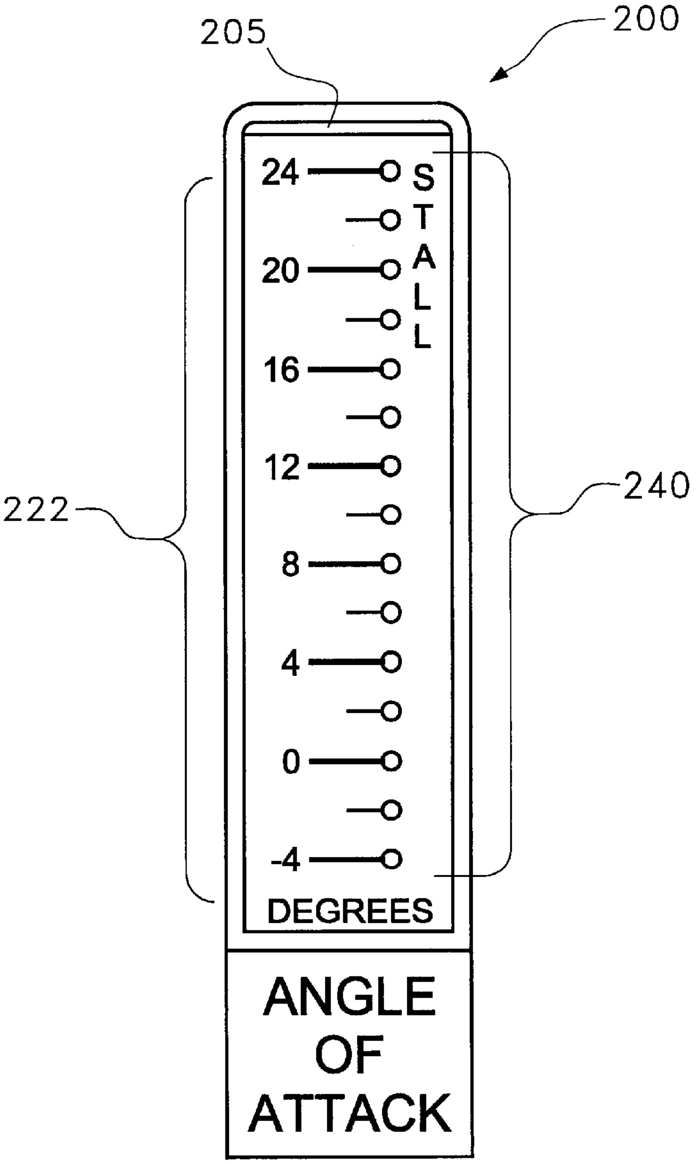
FIG. 5 is a plan view of the angle of attack indicator according to the present invention.
Figure 3:
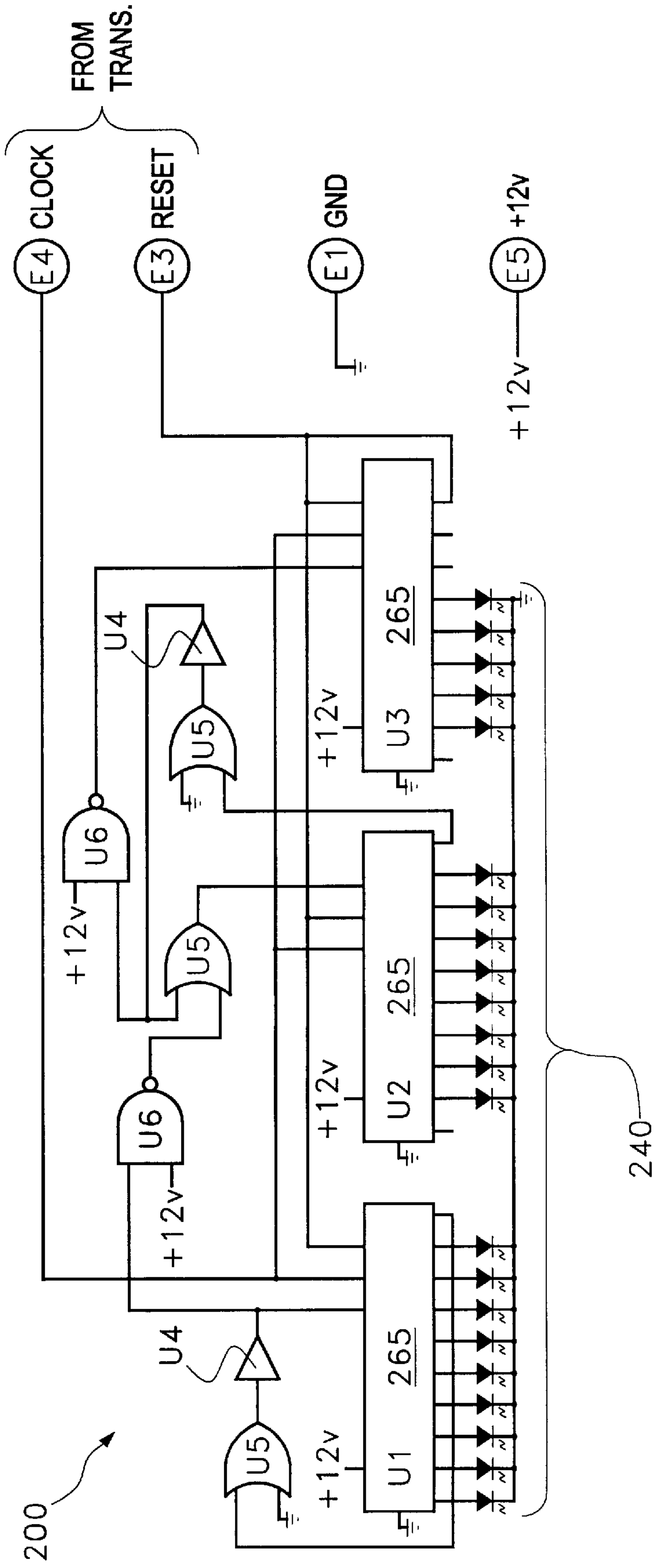
FIG. 3 is a circuit diagram of an indicator suitable for use in accordance with a preferred embodiment of the invention.

As shown in FIG. 3, the indicator 200 operates in synchronism with the transmitter 100. A clock signal (CLOCKin) generated at the transmitter via clock circuitry 170 is hard wired over line 172 to the indicator 200, and drives the count of corresponding decade counters 265. These decade counters alternately illuminate a set of indicator display LEDs 240. An exemplary configuration of display indicator 200 is depicted in FIG. 5, where each of the display LEDs in the array 240 is configured within a housing 205 in the cockpit and oriented in a vertical fashion with corresponding indicia 222 to provide visual indication of the angle of attack of the aircraft. Note that, in the preferred embodiment, the electronic circuitry associated with the display indicator 200, including the decade counters 265 and LED array 240, may be disposed on and interconnected via a PC board. Referring again to FIG. 3 (in conjunction with FIG. 2) reset signal generator logic circuitry 163, 164 (FIG. 2) at the transmitter is hard wired via line 173 to indicator 200 to reset the indicator decade counters 265 (and hence indicator LEDs 240) and therefore maintain the visual indication to the pilot in synchronization with the transmitter.

To elaborate, if the incident wind onto the airplane wing is such that a five degree displacement of the vane from the chord line of the wing results (i.e. a change of from zero to five degrees), then the movement of the vane of an amount equivalent to five degrees causes subsequent rotation of the circular mask by an equivalent amount, so that the transmitter mask is covering the first 4 LEDs equivalent to the 5 degree displacement of the vane from the chord line. In synchronism with the transmitter via the clock frequency f, the display indicator will show five LEDs lit. The transmitter decade counters 165 are reset (pin 15) when the fifth photo transistor in the photo-array 160 (FIGS. 2, 4) detects a lit LED. At the same time the reset signal which is hard wired to the indicator will reset the decade counters 265 (pin 15) of the indicator at the same synchronous count. The clock maintains this cycle of counts at the clock frequency which is input to both the transmitter and display indicator decade counters 165, 265 (pin 14) and there will be a steady indication of 5 degrees until the vane changes its angular position. A new count is generated up or down in synchronism with the vane's increase or decrease in angular position. Note that the clock enable input is represented at pin 13 for each of the decade counters.

Figure 6:
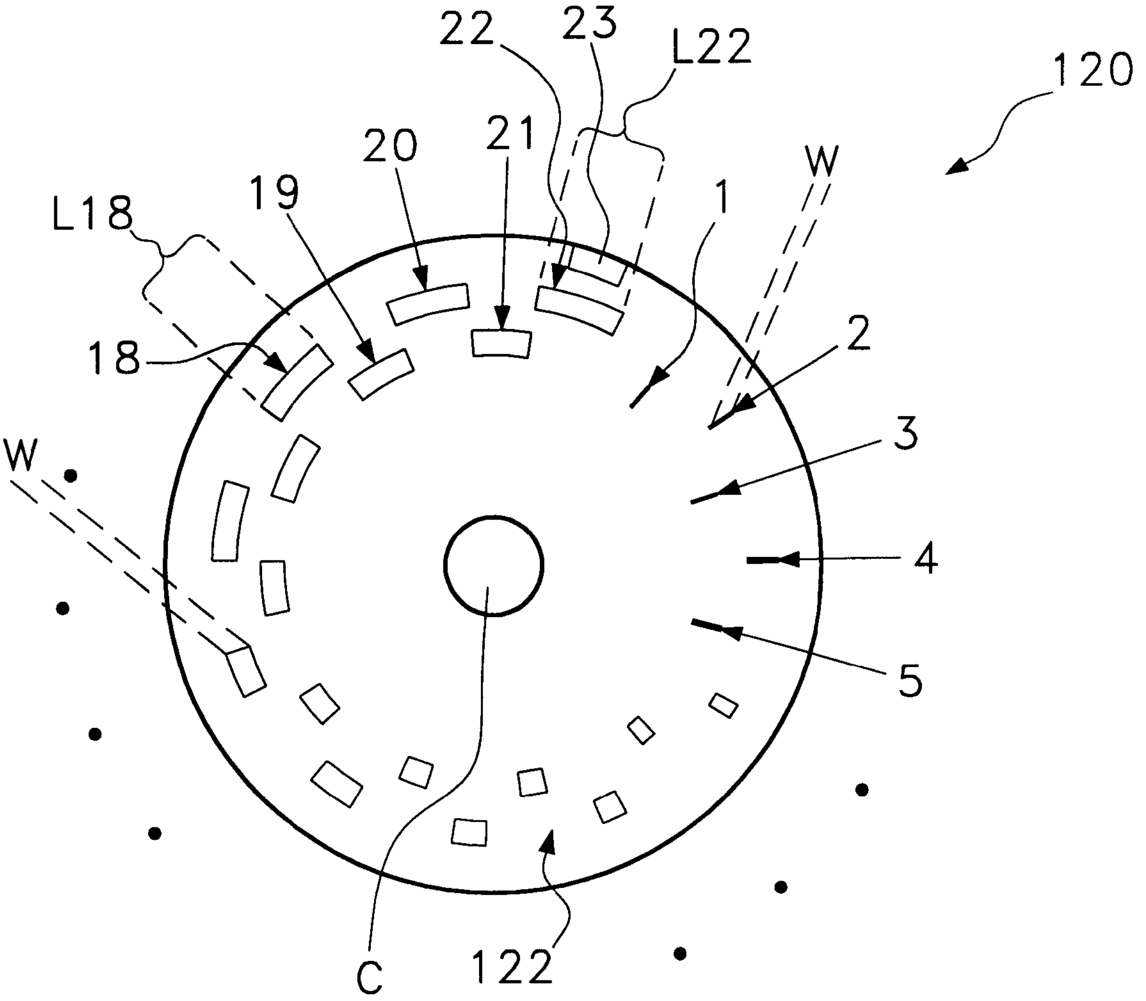
FIG. 6 provides a schematic top view of a circular mask connected to a movable vane in accordance with the present invention.

As shown in FIGS. 4 and 6 there is illustrated the unique construction of the mask and its features of amplifying the small detected angle of attack without utilizing a gear train. The array of transmitter LEDs are displaced over an angle of substantially 360 degrees. The mask which is directly attached and driven by the vane, moves through an angle equal to the angle to be measured. In this case the angle is 22 degrees. The effective amplification is achieved by the construction of the mask, as shown in FIGS. 4 and 6. Each consecutive window or slot of the mask, of which there are 22 (1, 2, 3, . . . 21, 22) shown, is constructed one degree larger than the previous window. Each consecutive window or slot has an equal width w and a length (L1, L2, L3, . . . L21, L22) which is successively larger than the previous slot length so as to correspond to an angular measurement associated with the angle of the air flow. In the preferred embodiment, the configuration of the mask is in the form of a circular disk with slots positioned as shown in FIG. 6 and radially from the center aperture C (for receiving the shaft) so as to achieve a resolution of substantially 1 degree. Note that lesser or greater resolution may be achieved by varying the configuration of the mask (i.e. adding or removing slots, which may result in an increase or decrease in the overall size of the mask) with a corresponding increase or decrease in the number of emitters and detectors respectively positioned on opposite sides of the mask. At the zero position of the vane and mask all LEDs in the transmitter are facing open windows or slots, and can be detected by the corresponding photo transistors. However, since the transmitter LEDs are sequenced ON by the decade counters 165 at the clock frequency f, the first LED at the zero position (i.e. LED 1 of FIG. 6) will cause activation of the reset signal (FIG. 2) and cause the decade counters 165 to start their count over. The same reset signal is sent to the indicator decade counters 265 which causes only the zero position indicator light LED to be illuminated, and thus appear to remain illuminated due to the clock frequency f. When the vane moves to a new angle, let's assume the new angle is the one degree position, then the mask will be moved to cover the zero position transmitter LED while all the remaining transmitter LEDs are remaining visible to the photo transistors through the mask's open slots. The decade counters 165 will be reset when the corresponding photo transistor in array 160 is turned ON by the second LED (i.e. LED 2 of FIG. 6). This causes a corresponding reset of the decade counters 265 in accordance with the clock frequency which allows the zero and the one degree indicator light to effectively appear to remain ON. That is, the frequency with which the zero and one position indicator LEDs will alternately illuminate is much greater than the eye flicker rate so that the user effectively views the display 200 as a solid light bar. There will be greater or lesser vertical illumination of the display indicator as the vane and attached mask move to a larger or smaller angle.

As mentioned, the clock frequency is set higher than the eye flicker rate, and therefore, the indicator display appears to be a solid light bar. This feature provides an indication of angle of attack without creating a distracting flicker on the instrument panel.

This unique mask arrangement eliminates all mechanical gearing usually associated with prior angle of attack indicators and employed to amplify a signal at the transmitter source and/or indicator. No synchronism of mechanical parts are required, so stops are not required at the transmitter vane for synchronizing the indicator with the vane.

As shown particularly in FIGS. 2, 3, 4, and 6, this preferred embodiment of the invention is an all solid state direct current (DC) power system. The system is preferably powered by a 12 volt power supply. The D/C power system is well-suited for installation on the smallest aircraft which do not employ alternating power sources, but is not limited to small aircraft. Large aircraft would also benefit since a direct current system is less expensive, and the D/C power supply on an aircraft is more reliable than an A/C source. An additional advantageous feature of the present invention consists in the fact that only four wires are needed to connect between the transmitter and display indicator, as shown in FIGS. 2 and 3. That is, a positive (12 volt supply) and a negative (ground) terminal, as well as a reset signal and clock signal are utilized in connecting between the transmitter and display indicator to allow the indicator and transmitter to be in electrical communication and synchronism. This allows the repetition of the angular measurement associated with the airflow incident to the airfoil without any servos, but rather using complete solid state electronics. A further advantageous feature is that the only moving part is the transmitter vane and its attached mask.

The use of decade counters provides for the possibility of a large number of LEDs to associate with particular angles and resolution. In the preferred embodiment, each of the ten counts associated with a corresponding decade counter (of which there are three) is associated with a one degree angle. Accordingly, this provides a possibility for 30 counts before one runs out of one degree increments or before one runs out of room on the decade counter for illuminating another LED.

Figure 7A:
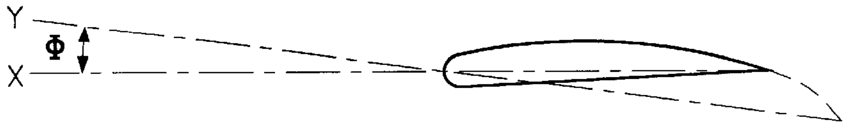
FIGS. 7A and 7B respectively illustrate schematic views of the change in wing cross-section chord line angle as a function of the degree of flap extension of the airfoil relative to the zero reference and incident wind direction.
Figure 7B:
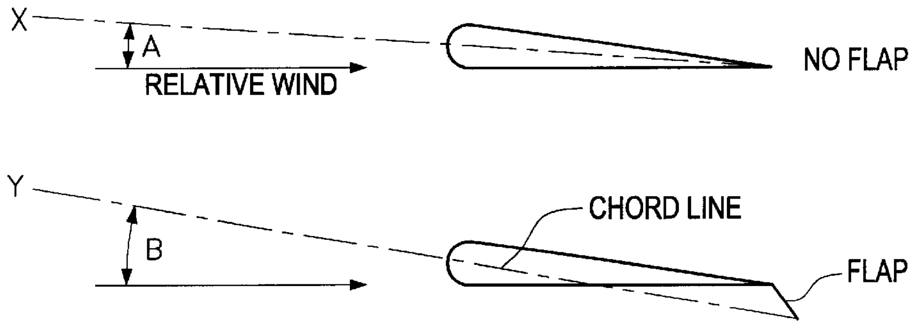
Figure 8:
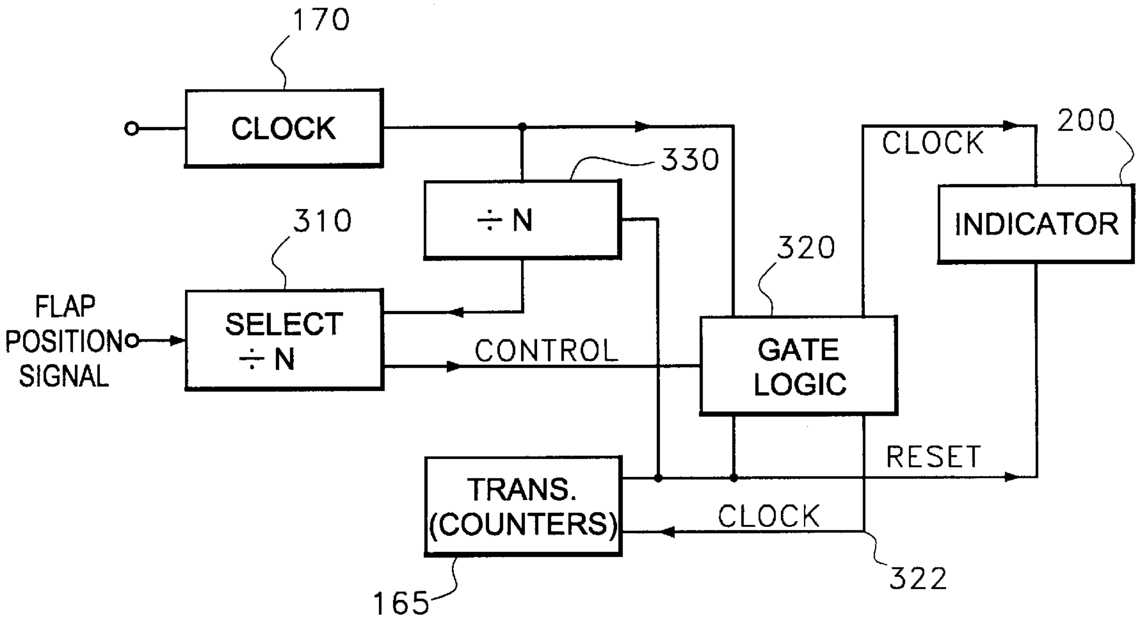
FIG. 8 illustrates a circuit block diagram for compensating the indicator zero due to flap extension according to an aspect of the present invention.

Another enhancement to the system as described herein, is illustrated in FIG. 8. FIG. 8 depicts an embodiment to the electronic circuitry described herein where the circuit operates to compensate for a change in chord angle by shifting the system zero reference. This change in chord angle is a result of deployment of the aircraft flaps. Referring now to FIGS. 7B, it can be seen that when an aircraft's flaps are deployed, the wing cross-section chord line assumes a higher angle to the relative wind. As shown in FIG. 7B the angle B is larger than the angle A and varies with the degree of extension of the flap. Therefore, provisions must be made to display this to the pilot of the aircraft. During calibration, the wind vane is set up so that the zero system reference is known. This is represented by chord line X as shown in FIG. 7A. Generally, the vane is set up so that it is parallel to the wing and thus, to the chord line. This may typically be accomplished by constructing two points or pins that protrude from the fuselage and that are at the same angle as the wing. One may then place a level or other measurement instrument onto the wing to determine what the particular angle is. The vane is then set up at the same angle and locked into place via conventional means. However, and as can be seen in FIG. 7A, when the flaps are lowered, and by the definition of the wing cross-section chord line as the line that connects the trailing edge of the wing with the center curvature of the wing, the chord line Y is at a higher or larger angle (i.e. angle Φ) than that of the original. Accordingly, the wing has a new zero reference point (i.e. chordline Y). However, one can not simply adjust and calibrate the vane with the new angle. To overcome this problem, the circuit described below with reference to FIG. 8, permits an electronic readjustment or calibration of the angle readout at the display indicator.

Referring now to FIG. 8, the system provides that when a zero shift is selected by an extension (or retraction) of the flap position by a predetermined amount, a signal is generated indicative of the flap position which is input to module 310 which enables a corresponding "divide by N" line. The transmitter clock 170 operates in the usual manner to generate a clock frequency signal which passes through gate logic module 320 to display indicator 200. The clock signal is allowed to clock the indicator display through the gate logic until the "divide by N" module 330 is satisfied. At the same time however, the clock signal 322 output from gate logic module 320 to the transmitter is blocked until the "divide by N" function is satisfied. This process advances the indicator display by the amount of the angular wing chord change due to the flap extension. The gate logic module 320 then allows the clock signal to activate the transmitter count which adds the vane position to the indicator display. The reset signal generated in the transmitter for a specific vane position then resets the transmitter, indicator, and the "divide by N" count and starts the described process over at the prescribed clock rate. Note that module 330 may be an additional decade counter where the given flap signal is indicative of the offset amount.

An example of the operation of the circuit is as follows. When the flaps are lowered by, for example, pilot action, a new wing chord line represents a theoretical degree zero shift of, for instance three degrees. The flap signal then selects a "divide by 3"—the indicator count will result in a display of three degrees. Up until that time the transmitter is blocked so as not to clock the vane position. When the "divide by 3" criteria is satisfied, the transmitter is then allowed to clock the vane position and add its count to the indicator which then displays the increase in the angle of attack.

While the foregoing describes the preferred embodiment of a system for displaying the angle of attack on a vertical light bar, it is to be understood that any electronically generated display would be suitable, such as simulation of a rotary dial by illumination of an electronic display. An additional feature is the generation of a warning signal, such as an audible signal (such as a horn or buzzer) or physical signal (such as a stick vibration) when excessive angle of attack is being approached. Also, a flashing light bar might be employed to catch the pilot's attention in case of a high angle of attack. This may be accomplished via placement of particular transmitter LEDs and detectors at discrete positions associated with certain threshold angles. That is, a discrete LED may be placed anywhere along the appropriate required angles. For instance, when the wing flap is lowered, one of two discrete position LEDs may be activated so as to indicate the appropriate angular change. Conventional electronic circuitry may be employed to provide such indicator signal to the indicator 200 with corresponding electronic detection circuitry to receive the signal and provide the appropriate output to the user. One can have any number of discrete positions in order to transmit specific signals (for example, dependant on flap position) to provide any type of additional indication, as well as a corresponding slot and photo detector associated with that specific LED to provide appropriate detection and signal transmission. An example is depicted in FIG. 6 where slot 23 is used to represent a discrete position associated with a warning or indication signal generated through corresponding emitter/detector operations.

Although the invention has been described and pictured in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

What is claimed is:

1. A system for sensing the incident direction of airflow by using a wind detecting vane, said vane attached to a first end of a rotatable shaft, a second end of the shaft attached to a disc that rotates with rotation of the shaft, a series of optical emitter-detector pairs located on opposite sides of said disc, each pair defining an optical path, said disc having a plurality of slots therethrough for permitting optical communication between at least one said pair along a corresponding optical path, each slot having a predetermined length measured along the direction of rotation of said disc about said shaft, wherein the length of each consecutive slot is successively larger and indicative of an angular measurement associated with the angle of incident direction of the airflow.

2. The system according to claim 1, wherein each slot is alignable with a corresponding emitter detector pair such that alignment of all said pairs with said corresponding slots is indicative of a zero position associated with said vane.

3. The system according to claim 1, wherein said system is a DC powered system.

4. The system according to claim 1, wherein each consecutively spaced slot in said disc is substantially one degree larger than the previous slot.

5. The system according to claim 1, wherein said emitters are displaced over an angle of substantially 360 degrees.

6. The system according to claim 1, further comprising a counter responsive to a clock signal for alternately illuminating said emitters arranged in a predetermined configuration.

7. The system according to claim 6, further comprising a display unit having a second counter responsive to the clock signal for alternately illuminating light sources arranged in a predetermined pattern, said second counter responsive to a reset signal initiated from one of said detectors for maintaining illumination of said light sources based on the number of emitters being illuminated.

8. The system according to claim 7, wherein said clock signal operates at a frequency higher than the eye flicker rate.

9. The system according to claim 7, further comprising means for providing a warning signal when said sensed incident direction of air flow exceeds a predetermined threshold.

10. The system according to claim 9, wherein said warning signal is selected from the group consisting of an audible signal, a visual signal and a vibrational signal.

11. A system for determining the incident direction of airflow onto an airfoil comprising:

a wind vane moveable in response to the direction of said airflow;

a counter for alternately illuminating a series of light emitting devices arranged in a predetermined pattern, each light emitting device having a value representative of a particular angular measurement associated with the direction of airflow;

a series of detectors disposed opposite said series of light emitting devices;

a mask located between said detectors and said light emitting devices and rotatable in response to said moveable vane, said mask operative for covering certain light emitting devices based on the position of said mask and having a plurality of spaced apart slots for enabling radiation from at least one of said illuminated light emitting devices to pass to the corresponding detector for causing detection;

wherein the value associated with the first illuminated light emitting device detected by said corresponding detector is representative of the angular measurement of the airflow.

12. The system according to claim 11, wherein said counter is driven by a clock signal at a predetermined frequency.

13. The system according to claim 12, further comprising a display unit responsive to said clock signal for alternately illuminating a second set of light emitting devices arranged in a predetermined configuration, wherein each of said second set of light emitting devices is representative of an angular measurement associated with the direction of air flow such that the sequential illumination of a subset of said second set of devices corresponds to the determined angular measurement of said air flow.

14. The system according to claim 13, said display unit further comprising a counter having an input for receiving said clock signal for alternately illuminating said second set of light emitting devices.

15. The system according to claim 11, wherein said series of light emitting devices comprises light emitting diodes (LEDs).

16. The system according to claim 11, wherein said system is DC powered.

17. The system according to claim 13, wherein said predetermined configuration comprises a vertical orientation of said second set of light emitting devices.

18. A gearless system for determining and displaying the incident direction of airflow onto an airfoil comprising: a transmitter having:

a vane moveable in response to the direction of said airflow;

a counter responsive to a clock signal for alternately illuminating a first series of light emitting devices arranged in a predetermined pattern, each light emitting device having a value representative of a particular angular measurement associated with the direction of said airflow;

a first series of detectors disposed opposite said first series of light emitting devices;

a mask coupled to said vane, said mask located between said detectors and said light emitting devices and rotatable in response to said moveable vane, said mask operative for covering certain of said light emitting devices based on the position of said mask, and having a plurality of spaced apart slots for enabling radiation from at least one of said illuminated light emitting devices to pass to the corresponding detector for causing detection and for generating a reset signal in response thereto; and a display comprising:

a counter; and a second series of light emitting devices arranged in a predetermined pattern; wherein said counter is responsive to the clock signal for alternately illuminating the light emitting devices of said second series in synchronism with said first series of light emitting devices, wherein each illuminated light emitting device of said second series corresponds to a predetermined angle associated with the angular direction of airflow, and wherein said display counter is responsive to said reset signal from said transmitter for maintaining synchronization with the transmitter counter such that the illumination of the light emitting devices of the second series is indicative of said angular measurement.

19. The system according to claim 18, wherein said reset signal is simulultaneously applied to said transmitter counter and to said display counter.

20. The system according to claim 19, wherein the value associated with the first illuminated light emitting device detected by said corresponding detector is representative of the angular measurement of the airflow.

21. The system according to claim 18, further comprising means responsive to a change in chord angle, for blocking said clock signal to said transmitter counter for a predetermined number of clock pulses for shifting the system zero reference angle.

22. The system according to claim 21, wherein said predetermined number of clock pulses corresponds to the amount of angle change associated with a change in chord line.

23. A system for sensing the incident direction of airflow by using a wind detecting vane, said vane attached to a first end of a rotatable shaft, a second end of the shaft attached to a disc that rotates with rotation of the shaft, said system comprising:

a series of optical emitter-detector pairs located on opposite sides of said disc, each pair defining an optical path, wherein said disc includes a plurality of slots therethrough for permitting optical communication between at least one said pair along a corresponding optical path and, wherein each slot of said plurality of slots is indicative of an angular measurement associated with the angle of incident direction of the airflow.

24. The system according to claim 23, wherein at least one of said plurality of slots is larger than at least one other of said plurality of slots.

25. The system according to claim 24, wherein the length of each consecutive slot is successively larger than the previous slot.

26. A system for sensing the incident direction of airflow by using a wind detecting vane, said vane attached to a first end of a rotatable shaft, said system comprising:

a disc rotatable depending on the incident direction of the airflow and having a series of spaced apart slots therein; and a detector located in proximity to said disc and responsive to information provided via at least one of said plurality of slots for producing a signal indicative of an angular measurement associated with the angle of incident direction of the airflow.

* * * * *